US009447924B2

(12) United States Patent
Fukasaku et al.

(10) Patent No.: US 9,447,924 B2
(45) Date of Patent: Sep. 20, 2016

(54) MOTOR DRIVEN COMPRESSOR FOR A VEHICLE

(71) Applicant: KABUSHIKI KAISHA TOYOTA JIDOSHOKKI, Kariya-shi, Aichi-ken (JP)

(72) Inventors: Hiroshi Fukasaku, Aichi-ken (JP); Kazuki Najima, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 444 days.

(21) Appl. No.: 14/024,920

(22) Filed: Sep. 12, 2013

(65) Prior Publication Data

US 2014/0076434 A1 Mar. 20, 2014

(30) Foreign Application Priority Data

Sep. 18, 2012 (JP) ................. 2012-204584

(51) Int. Cl.
*H02K 11/04* (2016.01)
*F17D 1/04* (2006.01)
*H02K 5/22* (2006.01)
*F04C 23/00* (2006.01)
*F04B 39/12* (2006.01)

(52) U.S. Cl.
CPC ............... *F17D 1/04* (2013.01); *F04B 39/121* (2013.01); *F04C 23/008* (2013.01); *H02K 5/22* (2013.01); *F04C 2240/30* (2013.01); *F04C 2240/808* (2013.01); *H02K 11/044* (2013.01); *Y10T 137/85978* (2015.04)

(58) Field of Classification Search
CPC . H02K 11/0094; F04B 39/12; F04B 39/121; F04B 2203/02; F04B 17/03; F04C 2240/808
See application file for complete search history.

(56) References Cited

U.S. PATENT DOCUMENTS

| 6,151,228 | A  | * | 11/2000 | Miyazaki | H02J 3/01 363/37 |
| 6,599,104 | B2 | * | 7/2003 | Saito | F04C 29/045 417/366 |
| 6,875,029 | B2 | * | 4/2005 | Kawabata | B60R 16/0239 439/76.2 |
| 7,207,187 | B2 | * | 4/2007 | Funahashi | F01C 21/10 62/113 |
| 7,652,902 | B2 | * | 1/2010 | Hattori | H05K 7/1432 363/145 |
| 8,939,739 | B2 | * | 1/2015 | Kinoshita | F04C 23/008 310/68 R |

(Continued)

FOREIGN PATENT DOCUMENTS

| CN | 1905328 A | 1/2007 |
| CN | 102333953 A | 1/2012 |

(Continued)

OTHER PUBLICATIONS

Extended European Search Report for corresponding EP Patent Application No. 13183477.2 issued on Dec. 4, 2013.

(Continued)

*Primary Examiner* — Burton Mullins
(74) *Attorney, Agent, or Firm* — Sughrue Mion, PLLC

(57) ABSTRACT

A first accommodation chamber accommodating therein an inverter unit with a built-in inverter circuit and a second accommodation chamber accommodating therein a filter unit with a built-in filter circuit are formed individually in different positions of a housing of a motor-driven compressor for a vehicle. The input terminals and the output terminals of the inverter unit and of the filter unit are all arranged so as to extend in the same direction.

12 Claims, 23 Drawing Sheets

(56) References Cited

U.S. PATENT DOCUMENTS

| | | | |
|---|---|---|---|
| 9,059,620 B2* | 6/2015 | Sato | H02K 11/0073 |
| 9,157,425 B2* | 10/2015 | Watanabe | F04B 35/04 |
| 2002/0073729 A1 | 6/2002 | Shibuya | |
| 2007/0024133 A1 | 2/2007 | Kato et al. | |
| 2009/0002956 A1 | 1/2009 | Suwa et al. | |
| 2009/0096301 A1* | 4/2009 | Sumi | H02K 11/0073 |
| | | | 310/89 |
| 2010/0183457 A1 | 7/2010 | Hattori et al. | |
| 2010/0247349 A1 | 9/2010 | Asai et al. | |
| 2011/0291501 A1* | 12/2011 | Watanabe | F04B 39/0027 |
| | | | 310/71 |
| 2013/0049550 A1 | 2/2013 | Watanabe et al. | |
| 2013/0224050 A1* | 8/2013 | Nakagami | F01C 21/10 |
| | | | 417/410.1 |
| 2015/0061421 A1* | 3/2015 | Yano | H02K 9/00 |
| | | | 310/52 |

FOREIGN PATENT DOCUMENTS

| | | |
|---|---|---|
| EP | 2 204 581 A1 | 7/2010 |
| EP | 2 461 039 A1 | 6/2012 |
| JP | 06-069746 A | 3/1994 |
| JP | 2002-188574 A | 7/2002 |
| JP | 20095512 A | 1/2009 |
| JP | 2009144590 A | 7/2009 |
| JP | 2011-032893 A | 2/2011 |
| JP | 2011247215 A | 12/2011 |
| WO | 2011/099429 A1 | 8/2011 |

OTHER PUBLICATIONS

Communication dated Aug. 5, 2015 from the State Intellectual Property Office of the People's Republic of China in counterpart application No. 201310421404.3.

* cited by examiner

MOTOR DRIVEN COMPRESSOR FOR A VEHICLE

BACKGROUND OF THE INVENTION

This invention relates to a motor-driven compressor adapted for use in a vehicle and provided with built-in inverter circuit and filter circuit.

As a refrigerant gas compressor used in a vehicle air conditioner, a motor-driven compressor has been known. In the housing of such motor-driven compressor, a compressor mechanism for compressing refrigerant gas, an electric motor for driving the compressor, an inverter circuit for controlling the driving power for the electric motor, and a filter circuit for removing the noise of input power for the inverter are accommodated. The inverter circuit and the filter circuit are usually housed in the same accommodation chamber formed in the compressor housing.

The filter circuit of the motor-driven compressor includes a capacitor and a coil of a relatively large size. The size of the filter circuit affects the designing of the shape or the size of an accommodation chamber in the housing and hence the outer shape of the motor-driven compressors. Additionally, any change of the outer shape affects the ease of mounting of the compressor to a vehicle. Therefore, it is hard to secure a space for an accommodation chamber having a required shape and size.

Japanese Unexamined Patent Application Publication No. 2011-32893 discloses a housing for motor-driven compressors for a vehicle which has formed therein a chambers for the inverter circuit and the filter circuit, respectively. Additionally, Japanese Unexamined Patent Application Publication No. 2002-188574 discloses a housing for motor-driven compressor for a vehicle which has formed therein a chamber for accommodating the capacitor of a filter circuit.

Therefore, arrangement of a chamber for accommodating the entire of a filter circuit or any component of the filter circuit separately from an accommodation chamber for an inverter circuit makes possible securing an accommodating space for the filter circuit while reducing the change of the outer shape of the compressor.

However, the provision of two separate chambers affects the ease of assembling of the inverter circuit and the filter circuit. Especially, the connection between the power cable for the motor-driven compressors and the input terminal of the filter circuit and the connection between the output terminal of the filter circuit and the inverter circuit need to be performed from opposite directions, which complicates the assembly of the filter circuit.

The present invention which has been made in light of the above problems is directed to a motor-driven compressor for a vehicle which is easy to provide accommodating space for the filter circuit and to assemble the filter circuit.

SUMMARY OF THE INVENTION

In accordance with the present invention, an inverter circuit and a filter circuit are incorporated in the motor-driven compressor for a vehicle. In the motor-driven compressor, a first accommodation chamber where the inverter circuit is accommodated is formed in the housing of the motor-driven compressor. A second accommodation chamber where the filter circuit is accommodated is formed in a part of the housing which is different from the part of the housing where the first accommodation chamber is formed. Furthermore, the filter circuit has an input terminal and an output terminal drawn out in the same direction from the filter circuit.

The provision of separate accommodation chambers for the filter circuit and the inverter circuit helps to secure an accommodation space for the filter circuit while restricting the change of the external shape of the motor-driven compressor to a minimum. Furthermore, the arrangement of the input/output terminals so as to be drawn out from the filter circuit in the same direction permits easy connection of the terminals and the inverter circuit and the like.

In the motor-driven compressor for a vehicle according to the present invention, the second accommodation chamber may be formed in communication with the first accommodation chamber in the direction of the extension of the input terminal and the output terminal, which makes it easy to connect between the filter circuit and the inverter circuit.

The second accommodation chamber may be in direct communication with the first accommodation chamber in any direction other than the direction in which the input/output terminals extend out from the filter circuit, which facilitates the connection between the input/output terminals of the filter circuit and the inverter circuit. Alternatively, it may be so arranged that the second accommodation chamber is not in direct communication with the first accommodation chamber.

Furthermore, it may be so arranged that the terminal for power supply of the motor-driven compressor extends from the first accommodation chamber. Additionally, the terminal for power supply of the motor-driven compressor may be attached in the same direction as the input/output terminals. By so arranging, the connection position of the cable for power supply is the same as in case of a motor-driven compressor wherein the filter circuit and the inverter circuit are accommodated in the same accommodation chamber. In this case, the design changes of peripheral structure of the motor-driven compressor may be kept at minimum in adopting the motor-driven compressor constructed according to the present invention. The terminal for power supply of the motor-driven compressor may be arranged extending from the second accommodation chamber.

In the motor-driven compressor for a vehicle according to the present invention, the housing of motor-driven compressor may be formed cylindrical and the first accommodation chamber may be formed at an end of the cylindrical housing. The second accommodation chamber may be formed extending in the axial direction of and on the periphery of the housing.

Additionally, the housing may form therein an accommodation space accommodating therein the compression mechanism and the electric motor. A partition wall may separate the accommodation space from the second accommodation chamber. The filter unit may extend in the axial direction of the electric motor, the inverter unit may extend in the traverse direction to the axis of the electric motor. The compression mechanism and the electric motor motor may be incorporated in the accommodation space in the axial direction of the electric motor.

Furthermore, a metal terminal may be incorporated in the housing. The inverter circuit may be connected to the electric motor through the metal terminal. The metal terminal may be drawn in the same direction as the input/output terminals.

By so arranging, the design change of peripheral structure of the motor-driven compressor that need to be made when adopting motor-driven compressor according to the present invention may be kept relatively small.

The second accommodation chamber may be arranged at an end of the housing of the motor-driven compressor and the first accommodation chamber may be formed extending in the axial direction of and on the periphery of the housing. By so arranging the first and the second accommodation chamber, the space for accommodation of the filter circuit is easily achieved.

A positive/negative input line and a positive/negative input line of the filter circuit may be arranged in parallel with an insulator interposed therebetween and a positive output line and a negative output line of the filter circuit may be arranged also in parallel with an insulator interposed therebetween. Such arrangement of the input and output lines helps to reduce the transmission of noise occurring between the input line and the output line of the filter circuit.

Furthermore, a passage allowing refrigerant to flow therethrough may be formed on accommodating space side of a partition wall which separates the second accommodation chamber from the accommodating space in which a compression mechanism and an electric motor are accommodated. This is advantageous in that overheating of the filter circuit is reduced by cooling by the refrigerant which passes through the refrigerant passage.

BRIEF DESCRIPTION OF THE DRAWINGS

The invention, together with the objects and advantages thereof, may best be understood by reference to the following description of the presently preferred embodiments together with the accompanying drawings in which.

DETAILED DESCRIPTION OF THE PREFERRED EMBODIMENTS

The following will describe a first embodiment of the motor-driven compressor for a vehicle according to the first preferred embodiment of the present invention with reference to FIGS. 1 through 9. The motor-driven compressor will hereinafter be referred to simply as "compressor."

Figure 1:
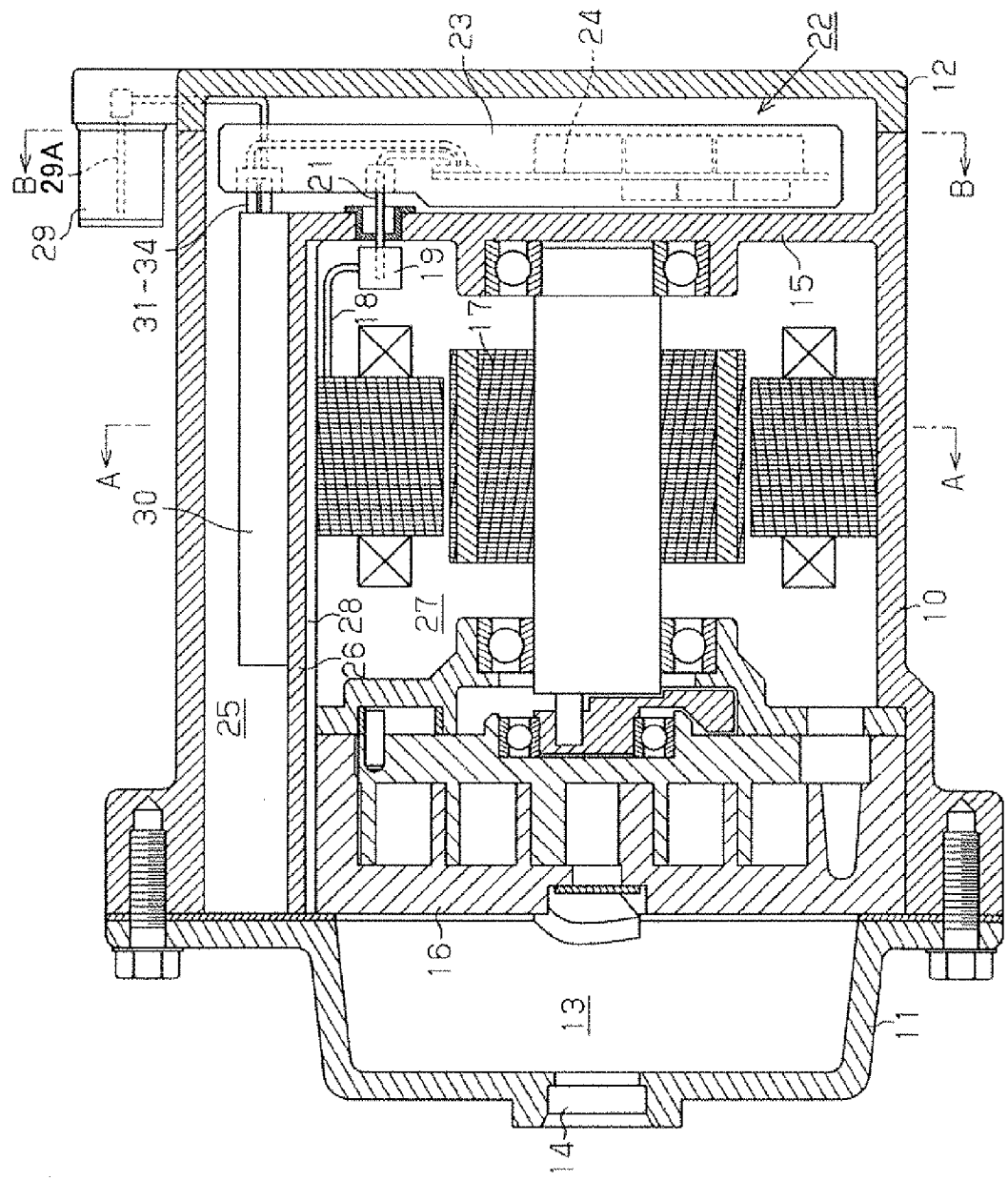
FIG. 1 is a longitudinal cross-sectional view of a motor-driven compressor for a vehicle according to a first embodiment of the present invention.

Referring to FIG. 1, the compressor includes a housing assembly composed of three metal parts, namely a motor housing 10 of a generally cylindrical shape, a discharge housing 11 connected to the left end of the motor housing 10 as seen in FIG. 1 and an inverter cover 12 connected to the opposite (or left) end of the motor housing 10.

A discharge chamber 13 is defined between the motor housing 10 and the discharge housing 11. The discharge chamber 13 is connected to an external refrigerant circuit through a discharge port 14 formed through the discharge housing 11.

The interior of the motor housing 10 is separated by partition walls 15, 26 into two spaces. The space formed in the motor housing 10 on the left side of the partition wall 15 in FIG. 1 is an accommodation space 27 in which a compression mechanism 16 and an electric motor 17 that drives the compression mechanism 16 are accommodated. The compression mechanism 16 and the electric motor 17 are incorporated in the axial direction of the electric motor 17. Although not shown in the drawing, a suction port is formed through the peripheral wall of the motor housing 10. The accommodation space 27 is connected to an external refrigerant circuit through the suction port.

Three lead wires 18 (only one wire being shown in FIG. 1) are drawn out from U-phase, V-phase and W-phase coils of the electric motor 17, respectively. A box-shaped cluster block 19 is arranged on the right side of the electric motor 17 as seen in FIG. 1. The three lead wires 18 are connected respectively to three metal terminals 21 (only one of which is shown in FIG. 1 (only one terminal being shown in FIG. 1)) which are fixed to the cluster block 19. The metal terminals 21 are disposed extending through the partition wall 15 from the cluster block 9, as shown in FIG. 1.

A first accommodation chamber 22 is formed between the partition wall 15 of the motor housing 10 and the inverter cover 12 and extends in the traverse direction to the axial direction of the motor housing 10. An inverter unit 23 having incorporated therein an inverter circuit 24 is accommodated in the first accommodation chamber 22 so as to extend in the traverse direction to the axial direction of the motor housing 10. The inverter circuit 24 and the electric motor 17 are connected to each other through the three metal terminals 21.

A connector 29 to which a power cable for the motor-driven compressor is connected is mounted on the periphery of the inverter cover 12. The connector 29 has therein terminals 29A of lines for power supply extending to the inverter unit 23 in the first chamber 22.

Figure 2:
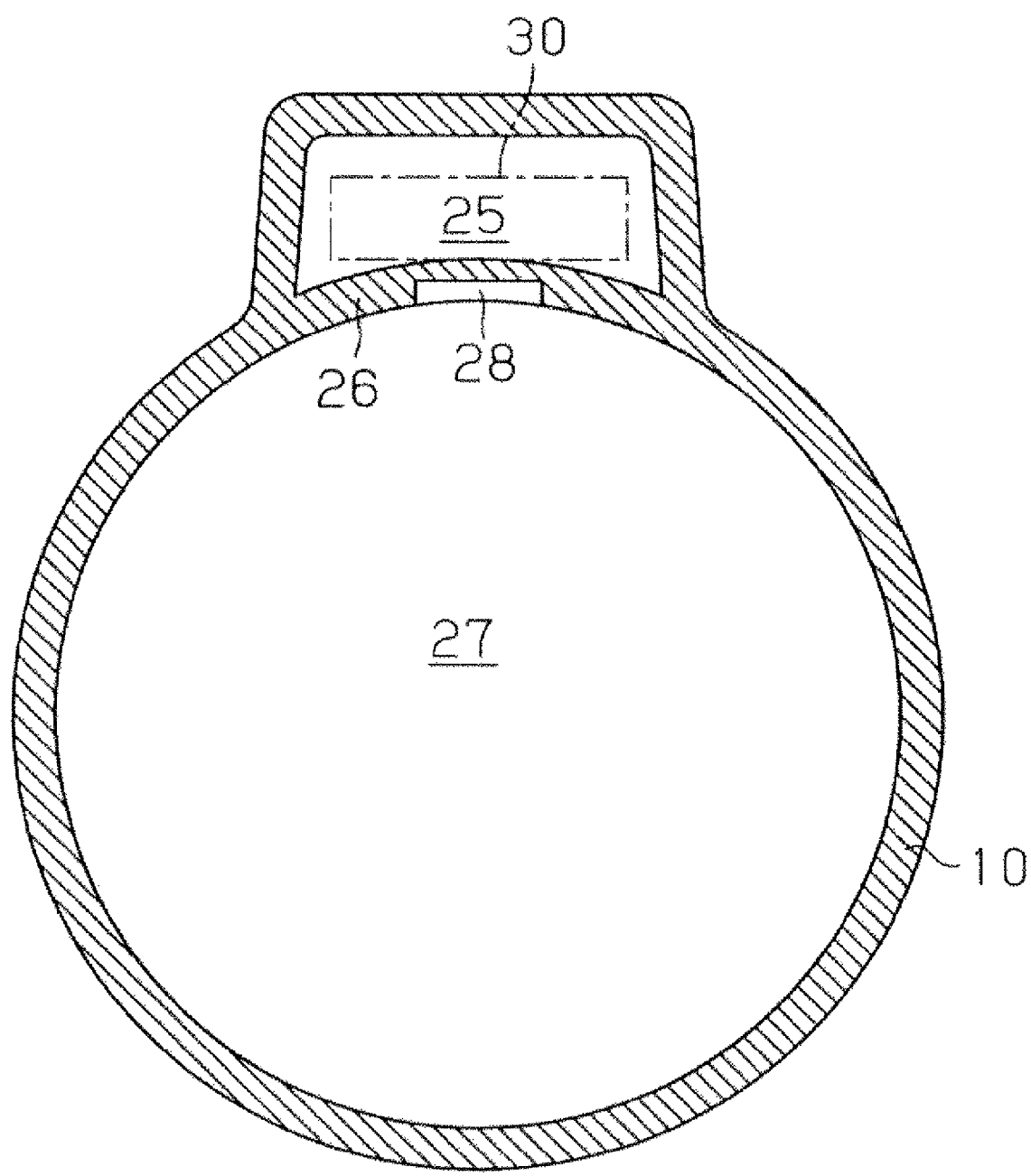
FIG. 2 is a cross-sectional view of a motor housing taken along the line of the A-A of FIG. 1.
Figure 3:
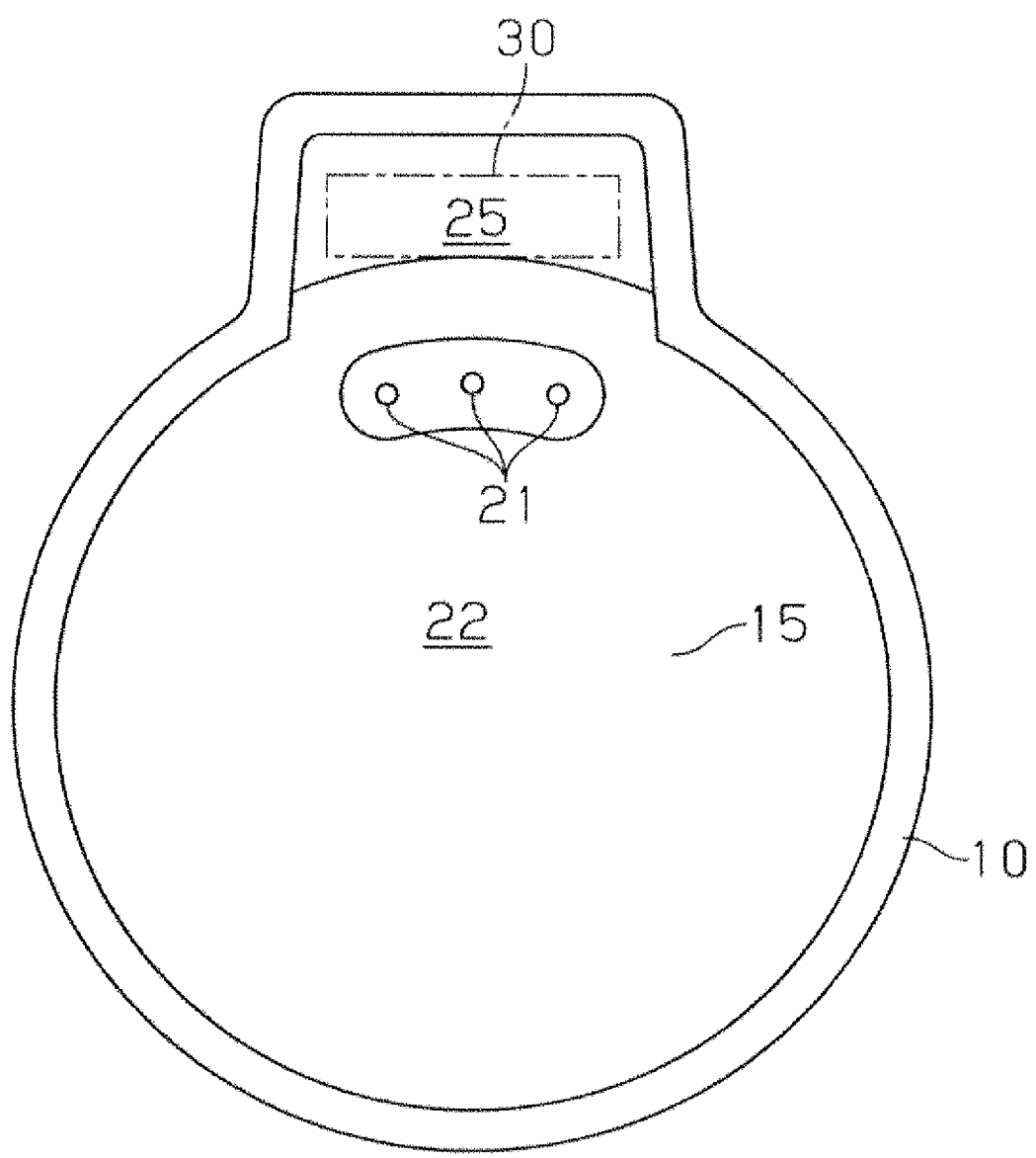
FIG. 3 is a cross-sectional view of the motor housing taken along the line of the B-B of FIG. 1.

A second accommodation chamber 25 is formed in a peripheral part in the motor housing 10 of the motor-driven compressor. Referring to FIGS. 2 and 3 showing the motor housing 10 in cross-section taken along lines A-A and B-B of FIG. 1, respectively, the motor housing 10 has a swelled portion projecting radially upward and the second accommodation chamber 25 is formed in the swelled portion of the motor housing 10. The second accommodation chamber 25 is separated from the accommodation space 27 by a partition wall 26. As shown in FIG. 1, the second accommodation chamber 25 is formed extending axially of the motor housing 10 on the periphery thereof. The first accommodation chamber 22 is open to the second accommodation chamber 25 so as to be connected to the second accommodation chamber 25 through the opening.

A filter unit 30 having incorporated therein a filter circuit is accommodated in the second receiving chamber 25 so as to extend in the axial direction of the electric motor 17. Input and output terminals 31 to 34 of a filter circuit extend out from one end of the filter unit 30 that is adjacent to the first accommodation chamber 22. The filter circuit is connected to the inverter unit 23 through the input and the output terminals 31 to 34 of the filter circuit. The positive and negative input terminals 31, 32 of the filter circuit are connected to the respective power supply terminals 29A through the inverter unit 23. The positive and negative output terminals 33, 34 of the filter circuit are connected respectively to the inverter circuit 24 in the inverter unit 23. The terminal 29A extends in the same direction as the input/output terminals 31 to 34 of the filter circuit. Further, the metal terminals 21 extend in the same direction as the terminal 29A extends.

A groove 28 is formed in the inner peripheral surface of the partition wall 26. This groove 28 forms a part of the passage in which refrigerant flows.

The following will describe the filter unit 30 and the filter circuit more in detail with reference to FIGS. 4 to 8.

Figure 4:
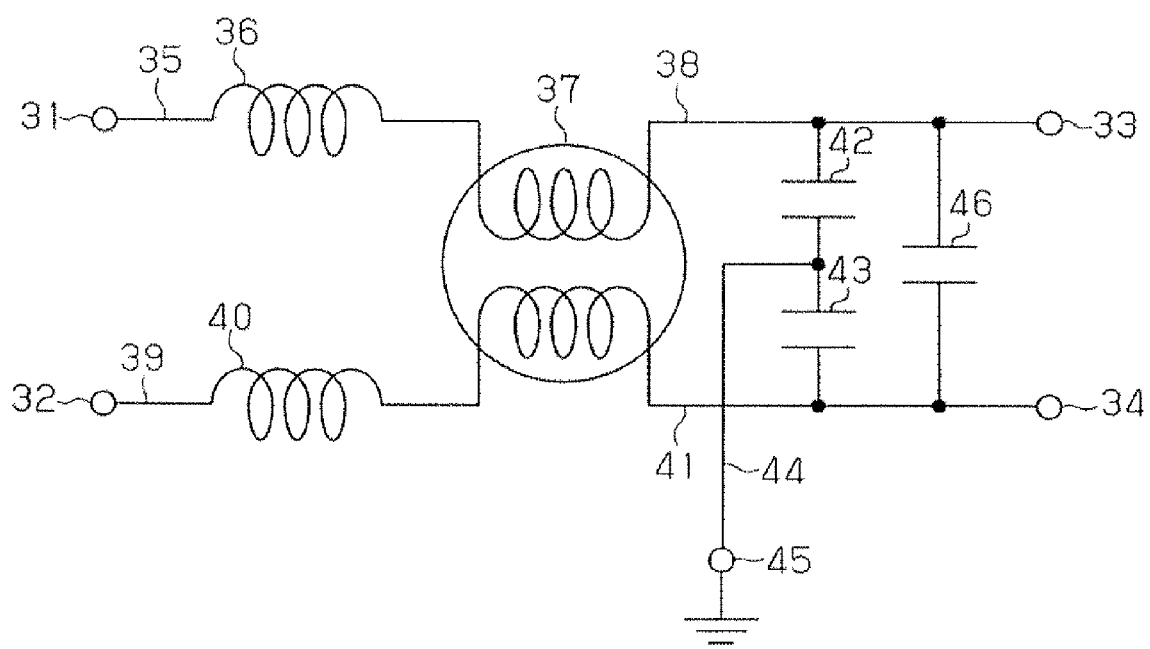
FIG. 4 is a schematic circuit diagram of a filter circuit of the motor-driven compressor according to the first embodiment.

Referring to FIG. 4 showing the filter circuit, the positive input line 35 is connected to the positive input terminal 31 in the filter circuit. A normal coil 36 is connected in the positive input line 35.

The normal coil 36 is connected at the output thereof to a positive output line 38 through a common coil 37. The positive output line 38 is connected to the positive output terminal 33 of the filter circuit.

On the other hand, a negative input line 39 of the filter circuit is connected to the negative input terminal 32 of the filter circuit. A normal coil 40 is connected in the negative input line 39. The normal coil 40 is connected at the output thereof to a negative output line 41 through a common coil 37. The negative output line 41 is connected to the negative output terminal 34.

The positive output line 38 and the negative output line 41 are connected through two Y capacitors 42 and 43 which are connected in series. A ground line 44 is connected to a point in a line between the two Y capacitors 42 and 43. The ground line 44 is connected at the output thereof to an earth terminal 45 of the filter circuit. The positive output line 38 and the negative output line 41 are also connected through a smoothing capacitor 46.

Incidentally, any components of the filter may be removed depending on the condition of noise development. For instance, if the normal noise development is small, at least one of the normal coil 36, 40 is dispensable. If the common noise development is small, the common coil 37, or the Y capacitors 42, 43, and the earth terminal 45 is dispensable.

Figure 5:
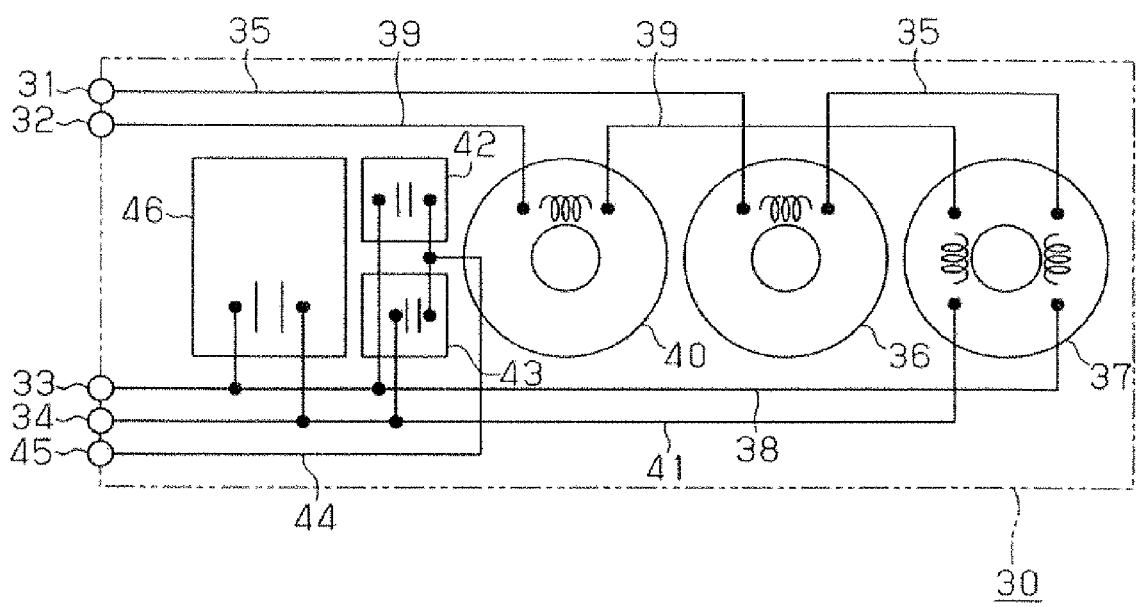
FIG. 5 is a schematic plan view showing an arrangement of components of the filter circuit.

An arrangement of components of the filter circuit in the filter unit 30 is shown in FIG. 5. The following will describe in detail the configuration of the filter unit 30.

Figure 6:
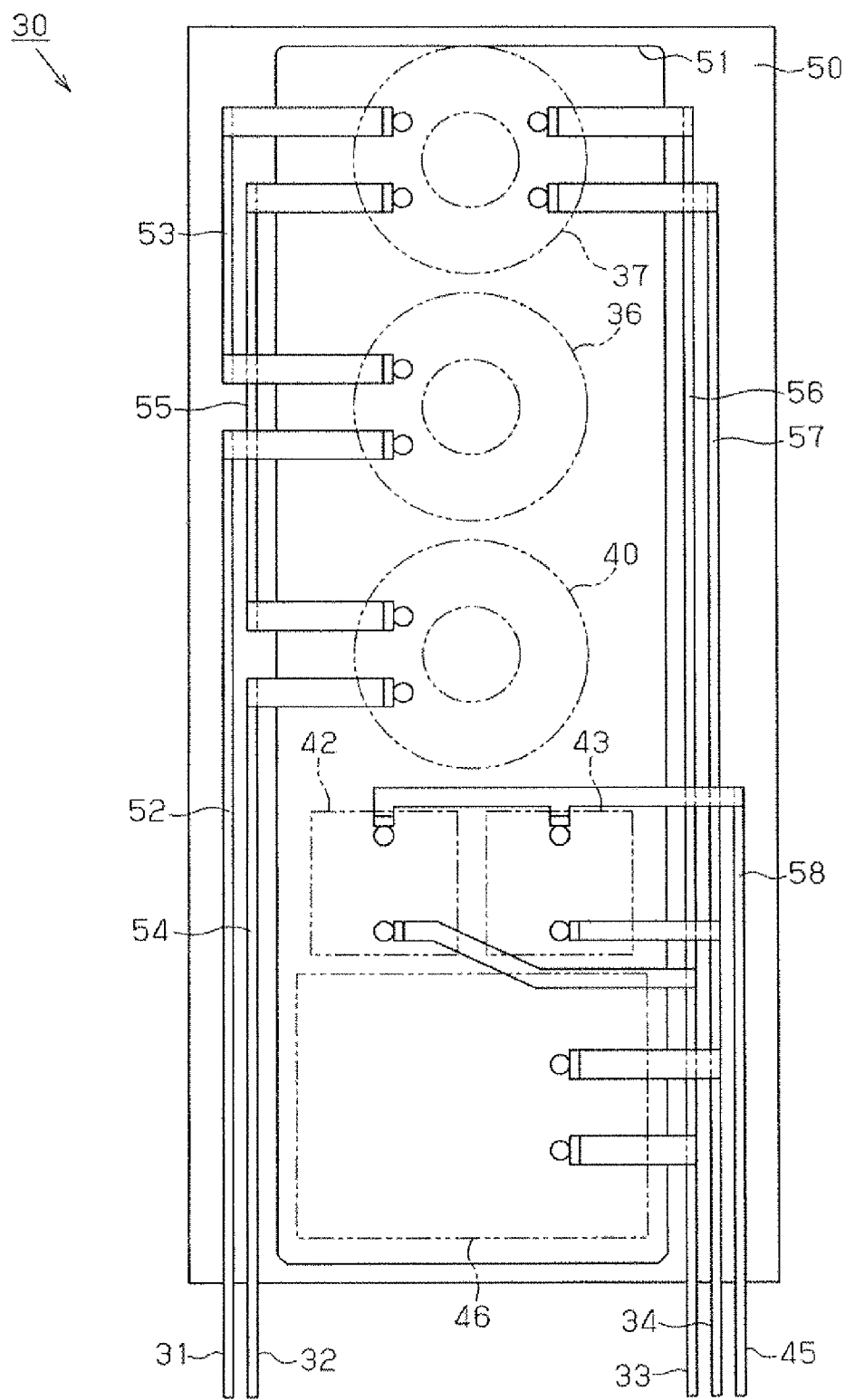
FIG. 6 is a plan view of a filter unit of the motor-driven compressor according to the first embodiment of the present invention.

Referring to FIG. 6, the filter unit 30 includes a case 50 which has a rectangular parallelepiped shape and is made of an insulating resin. A recess 51 is formed in the upper surface of the case 50. The elements of the filter circuit, i.e., the normal coil 36, the common coil 37, the normal coil 40, the Y capacitors 42 and 43, and the smoothing capacitor 46 are arranged in the recess 51.

Two busbars 52 and 53 which form the positive input line 35 and two busbars 54 and 55 which form the negative input line 39 are mounted to the left lateral side of the case 50 as seen in FIG. 6. The two busbars 52 and 53 and the two busbars 54 and 55 are spaced away from each other in parallel arrangement.

A busbar 56 that forms the positive output line 38, a busbar 57 which forms the negative output line 41, and a busbar 58 that forms the ground line 44 are mounted to the right lateral side of the case 50 as seen in FIG. 6. The busbars 56 to 58 are spaced from each other in parallel arrangement.

The lower ends of the busbar 52, the busbar 54, the busbar 56, the busbar 57 and the busbar 58 as seen in FIG. 6 extend out from the end of the case 50. The ends of the respective busbars lying outside the case 50 serve as the positive input terminal 31, the negative input terminal 32, the positive output terminal 33, and the negative output terminal 34, and the earth terminal 45 of the filter circuit, respectively.

Figure 7A:
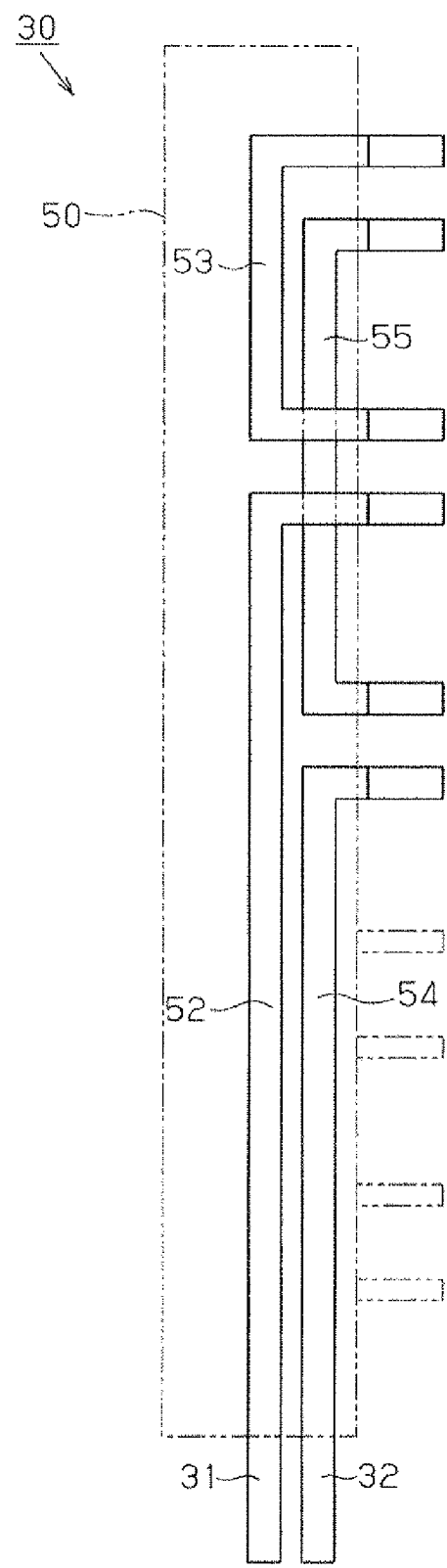
FIG. 7A is a side view showing an arrangement of busbars of the filter unit as seen from the left side of FIG. 6.
Figure 7B:
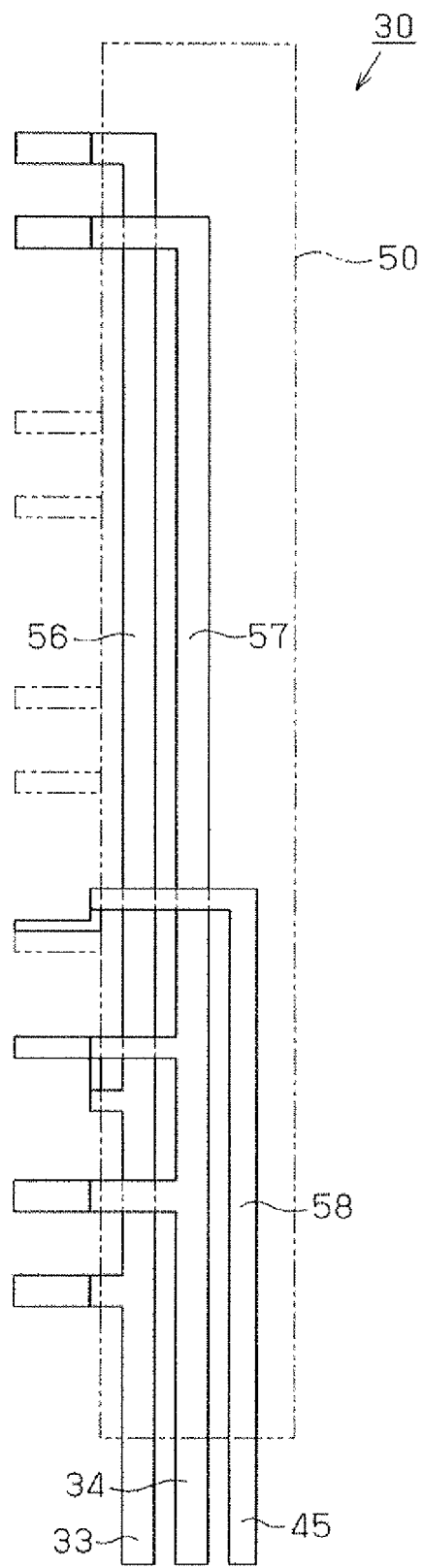
FIG. 7B is a side view showing an arrangement of busbars of the filter unit as seen from the right side of FIG. 6.

FIG. 7A shows the arrangement of the busbars in the filter unit 30 as viewed from the left side of FIG. 6 with the case 50 indicated by phantom line. FIG. 7B shows the arrangement of the busbars in the filter unit 30 as viewed from the right side of FIG. 6 with the case 50 indicated by phantom line.

Figure 8A:
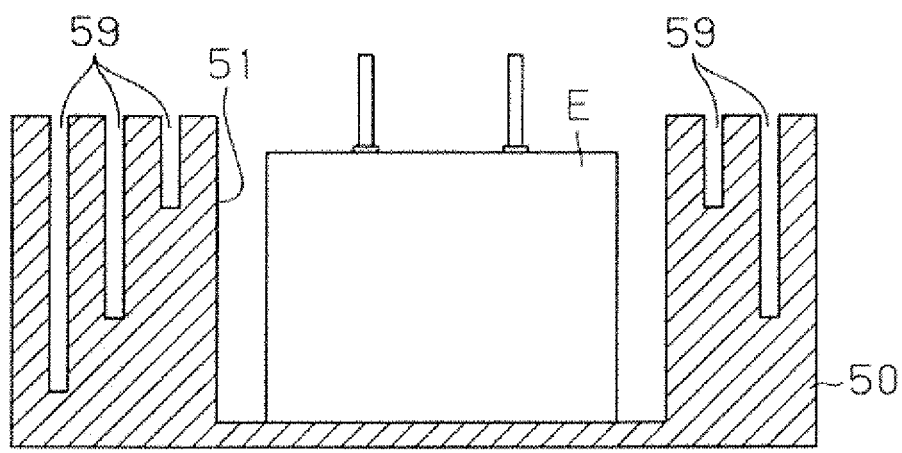
FIGS. 8A to 8D are schematic views showing steps of manufacturing procedure of the filter unit.
Figure 8B:
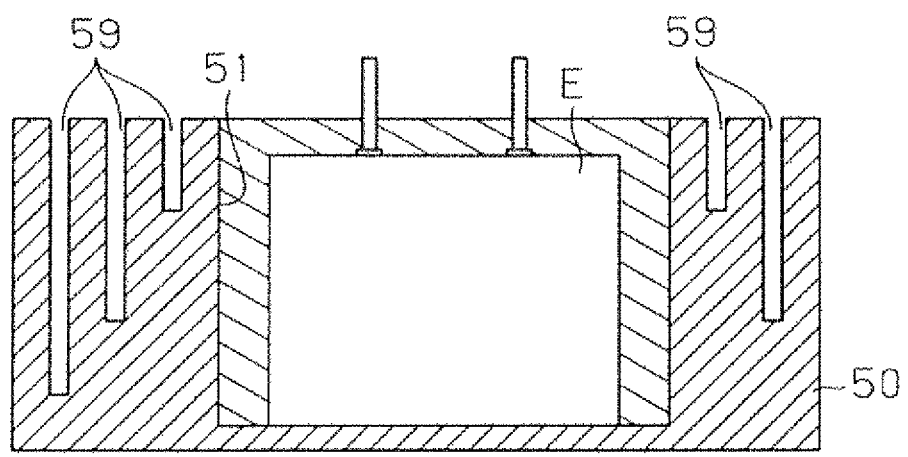
Figure 8C:
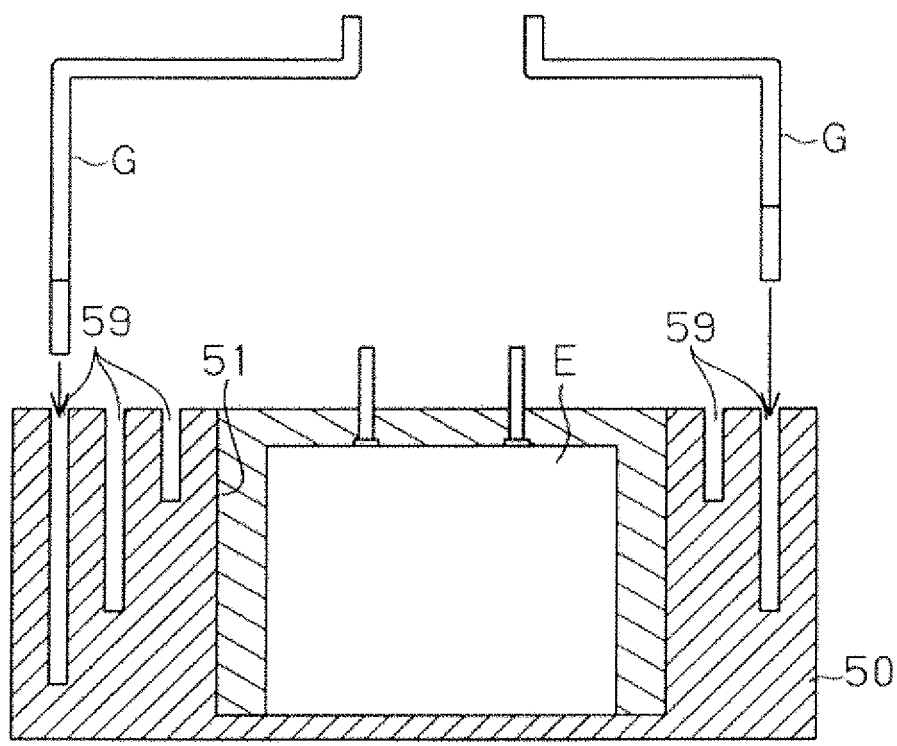
Figure 8D:
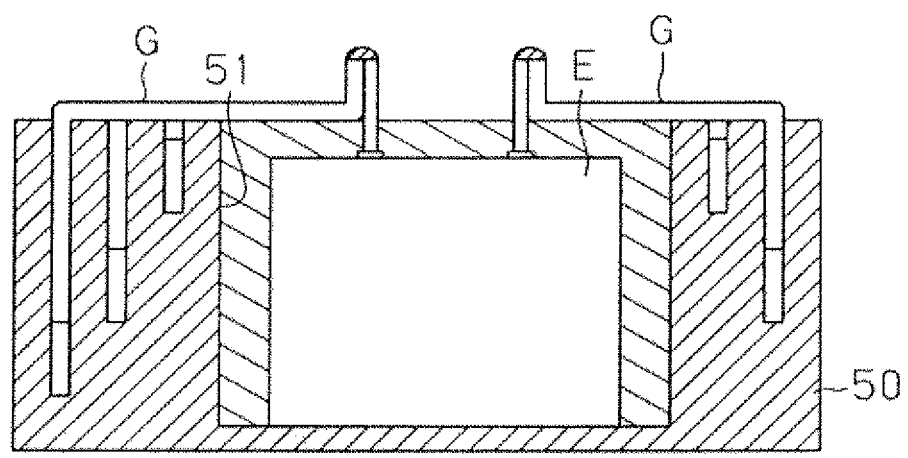

FIGS. 8A to 8D illustrate manufacturing procedure of the filter unit 30. The following will describe the procedure of manufacturing the filter unit 30 with reference to the drawings. Firstly, each element E of the filter circuit is placed in the recess 51 of the case 50, as shown in FIG. 8A. Next, each of the elements E of the filter circuit is fixed to the case 50 by infusing with potting or epoxy resin and solidifying in the recess 51, as shown in FIG. 8B. Subsequently, the busbar G is fitted in a plurality of the grooves 59 formed on both sides of the recess 51 of the case 50, as indicated by arrows in FIG. 8C, and is fixed. The elements E of the filter circuit is connected to the busbar G by welding or brazing, as shown in FIG. 8D.

In the filter unit 30 manufactured as described above, the busbars 52, 53 which form the positive input line 35 and the busbars 54, 55 which forming the negative input line 39 are arranged in parallel with the resin that forms the case 50 interposed therebetween. Similarly, the busbar 56 which forms the positive output terminal 33 and the busbar 57 which forms the negative output line 41 are also arranged in parallel with the resin that forms the case 50 interposed therebetween.

Figure 9:
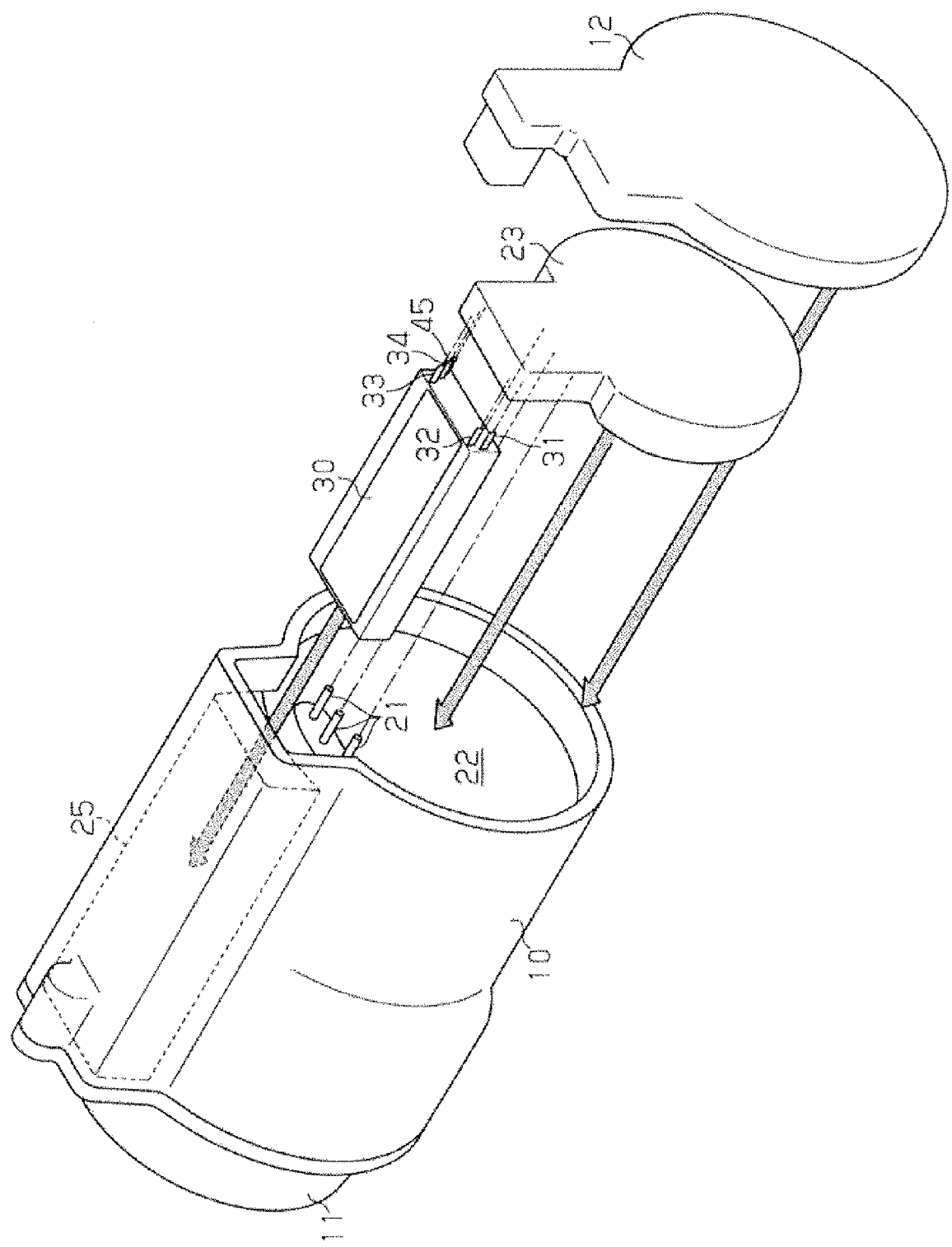
FIG. 9 is an exploded perspective view of the motor-driven compressor according to the first embodiment.

The following will describe the manner of assembling of the inverter unit 23 and the filter unit 30 of the motor-driven compressor according to the present embodiment. Here, a side which the discharge housing 11 is located is defined as a front side, and, a side which the inverter cover 12 is located is defined as a rear side. For assembling of these units, firstly, the filter unit 30 is inserted into the second accommodation chamber 25 from the side of the motor housing 10 to which the inverter cover 12 is installed with the terminals 31 to 34, 45 of the filter unit 30 located on the rear side of the motor housing 10, as shown in FIG. 9. Subsequently, the inverter unit 23 is mounted to the rear end of the motor housing 10. Next, the inverter cover 12 is mounted to the rear end of the inverter cover 12. By so assembling, the terminals 31 to 34, 45 of the filter circuit provided in the filter unit 30 and the metal terminals 21 fixed to the motor housing 10 are connected to the inverter unit 23. Fixing the inverter cover 12 to the motor housing 10, assembling of the inverter unit 23 and the filter unit 30 to the motor-driven compressor is completed.

The motor-driven compressor for a vehicle according to the first embodiment of the present invention offers the following advantages.

(1) According to the present embodiment of the motor-driven compressor for a vehicle, the first accommodation chamber 22 having accommodated therein the inverter unit 23 with the built-in inverter circuit 24 and the accommodation chamber 25 having accommodated therein the filter unit 30 with the built-in filter circuit are formed at different positions in the housing 10. Additionally, the input terminals 31, 32 and the output terminals 33, 34 are drawn in the same direction from the filter unit 30. Thus, the space for accommodating therein the filter circuit may be secured while minimizing a change of the outer shape of the compressor. Furthermore, the connection between the inverter circuit and the respective input and output terminals may be accomplished by movement of either one of the inverter circuit and the filter circuit relative to the other in one direction. Therefore, according to the motor-driven compressor for a vehicle in the present embodiment, the accommodation space for the filter circuit is made easily available and the assembling of the filter circuit can be made with ease.

(2) According to the present embodiment of the motor-driven compressor for a vehicle wherein the second accommodation chamber 25 is formed in communication with the first accommodation chamber 22 in axial direction of the motor housing 10 or in the direction in which the input terminals 31, 32 and the output terminals 33, 34 of the filter circuit are drawn out from the filter unit 30, the filter circuit is easily connectable to the inverter circuit.

(3) According to the present embodiment of the motor-driven compressor for a vehicle wherein the terminal 29A for power supply in the motor-driven compressor is drawn from the first accommodation chamber 22, the connecting position of the power supply cable may be the same as in case of the motor-driven compressor in which the filter circuit and the inverter circuit are accommodated in the same accommodation chamber. Therefore, any design change of the peripheral structure of the motor-driven compressor due to the adoption of the present embodiment of the invention can be kept minimum.

(4) According to the present embodiment of the motor-driven compressor for a vehicle, the busbars 52 and 53 which form the positive input line 35 and the busbars 54 and 55 which form the negative input line 39 are arranged in parallel with the insulator interposed therebetween. Additionally, the busbar 56 which forms the positive output terminal 33, the busbar 57 which forms the negative output line 41, and the busbar 58 which forms the ground line 44 are also arranged in parallel with the insulator interposed between any two adjacent busbars. Therefore, transmission of the noise of the current flowing through the output line to the input line is suppressed. Additionally, transmission of the noise of the current flowing through the input line to the output line is also suppressed. Therefore, according to the present embodiment of the motor-driven compressor for a vehicle, the noise development is reduced effectively.

(5) According to the present embodiment of the motor-driven compressor for a vehicle, a passage for refrigerant (the groove 28) is formed on the accommodating space 27 side of the partition wall 26 which separates the second accommodation chamber 25 and the accommodating space 27. Therefore, the provision of such refrigerant gas passage cools and hence protects the filter circuit from overheating.

Figure 10:
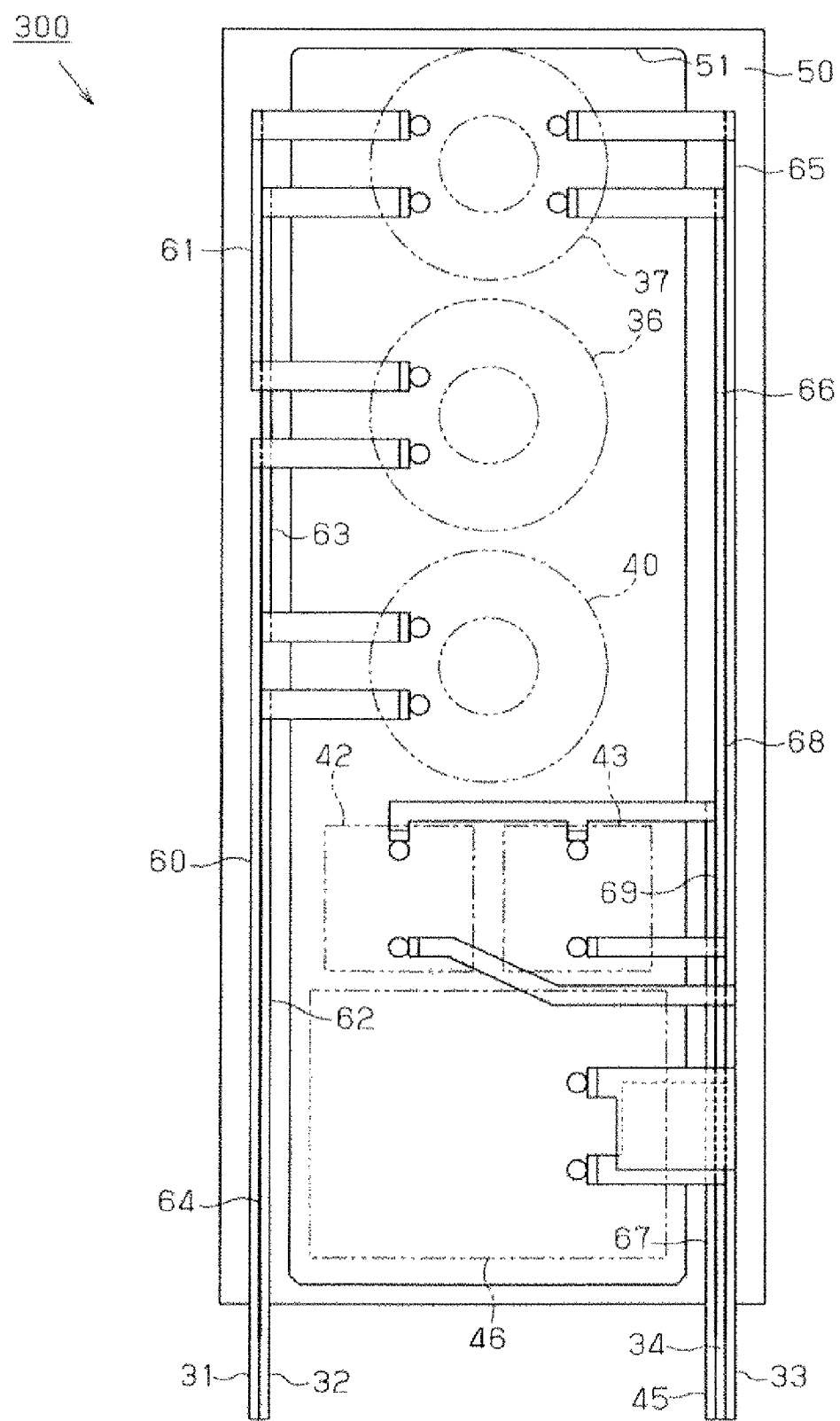
FIG. 10 is a plan view of a filter unit of a motor-driven compressor for a vehicle according to a second embodiment of the present invention.

The following will describe a second embodiment of the motor-driven compressor for a vehicle according to the second preferred embodiment of the present invention with reference to FIGS. 10 and 11. In the present embodiment and each of the following embodiments, the parts or elements that are common with the first embodiment described above are designated by the same reference numerals and redundant explanations thereof will be omitted. The second embodiment differs from the first embodiment in the arrangement of the respective lines in the filter unit.

Referring to FIG. 10 showing the filter unit 300 of the motor-driven compressor for a vehicle of the second embodiment, the two busbars 60, 61 which form the positive input line 35 and the two busbars 62, 63 which form the negative input line 39 are arranged in the left side of the case 50 as seen in FIG. 10 in such a way that the positive and negative input lines 35, 39 are disposed on the opposite sides of a first insulating sheet 64 in contact therewith. Similarly, in the right side of the case 50, the busbar 65 which forms the positive output line 38, the busbar 66 which forms the negative output line 41 and the busbar 67 which forms the ground line 44, are arranged in such a way that the positive and negative output lines 38, 41 are disposed on the opposite sides of a second insulating sheet 68 in contact therewith and the negative output line 41 and the ground line 44 are disposed on the opposite sides of a third insulating sheet 69 in contact therewith.

In this embodiment, the positive input line 35 and the negative input line 39 in the filter circuit are also arranged in parallel with an insulating material interposed therebetween. Additionally, the positive output line 38, the negative output line 41 in the filter circuit and the grandline 44 are arranged in parallel with an insulating material interposed between any two adjacent lines. Therefore, transmission of noise of the currents flowing through the output line to the input line and through the input line to the output line is effectively suppressed.

In the embodiment, enlarging the width of respective busbars 60 to 63, 65 to 67, substantially the entirety of the both sides of the case 50 is covered by the busbars 60 to 63 and 65 to 67. Therefore, the busbars 60 to 63, 65 to 67 function as a masking shield, thus leakage of electrical noise from the elements of the filter circuit and penetration of external noise from outside are effectively suppressed.

Figure 11A:
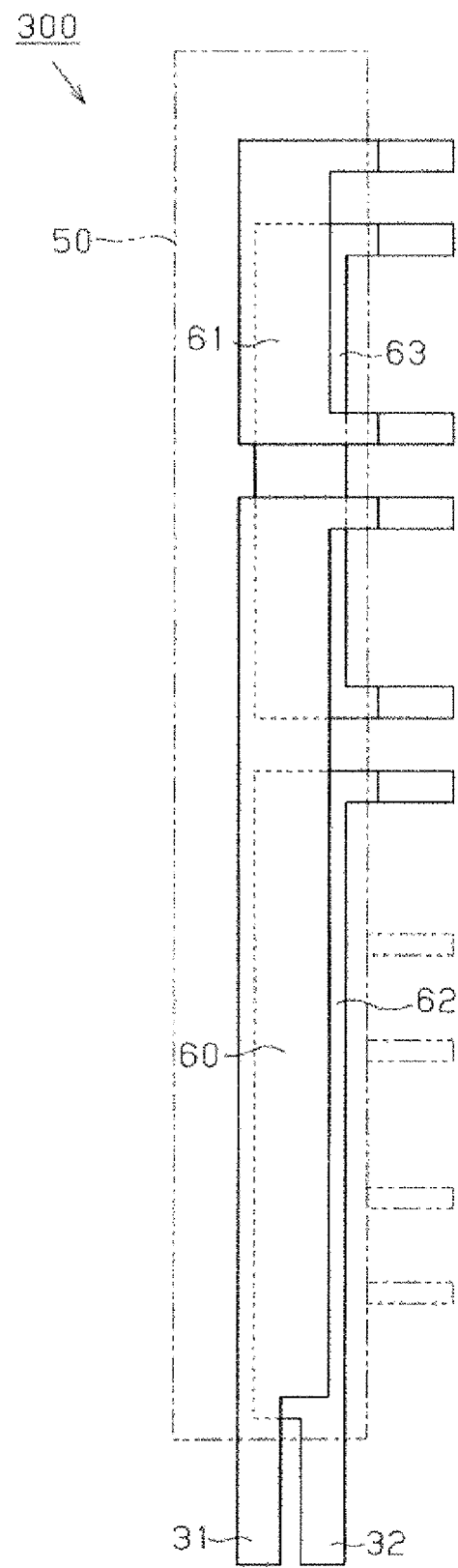
FIG. 11A is a side view showing an arrangement of busbars of the filter unit as seen from the left side of FIG. 10.
Figure 11B:
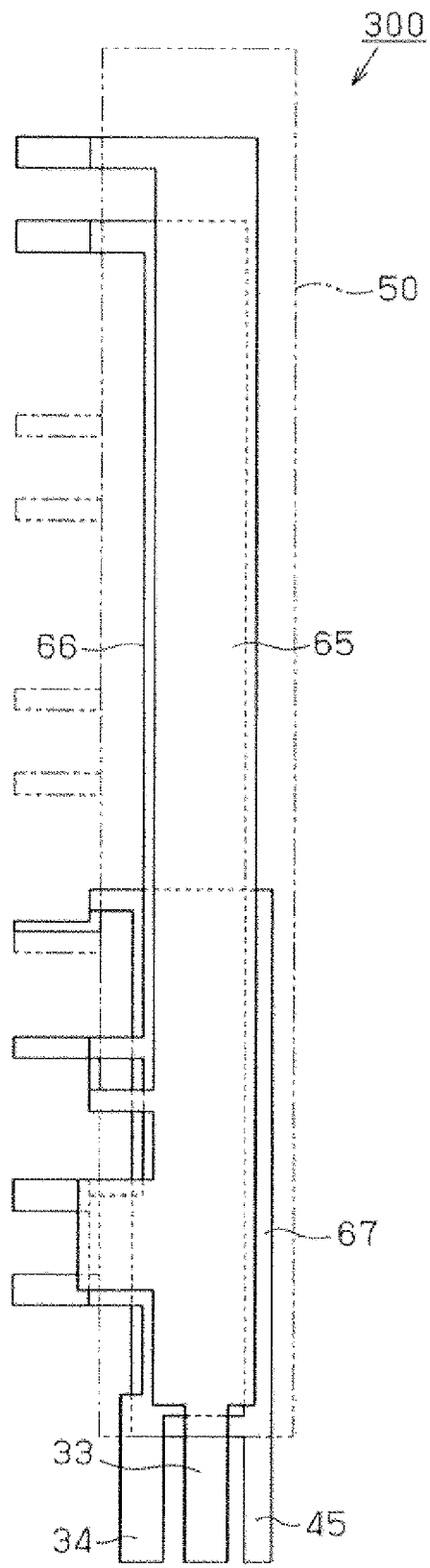
FIG. 11B is a side view showing an arrangement of busbars of the filter unit as seen from the right side of FIG. 10.

FIG. 11A shows a location of each busbar in the filter unit 300 as seen from the left side of FIG. 10 with the case 50 indicated by phantom line. Similarly, FIG. 11B shows a location of each busbar in the filter unit 300 as seen from the left side of FIG. 10 with the case 50 indicated by phantom line.

Figure 12:
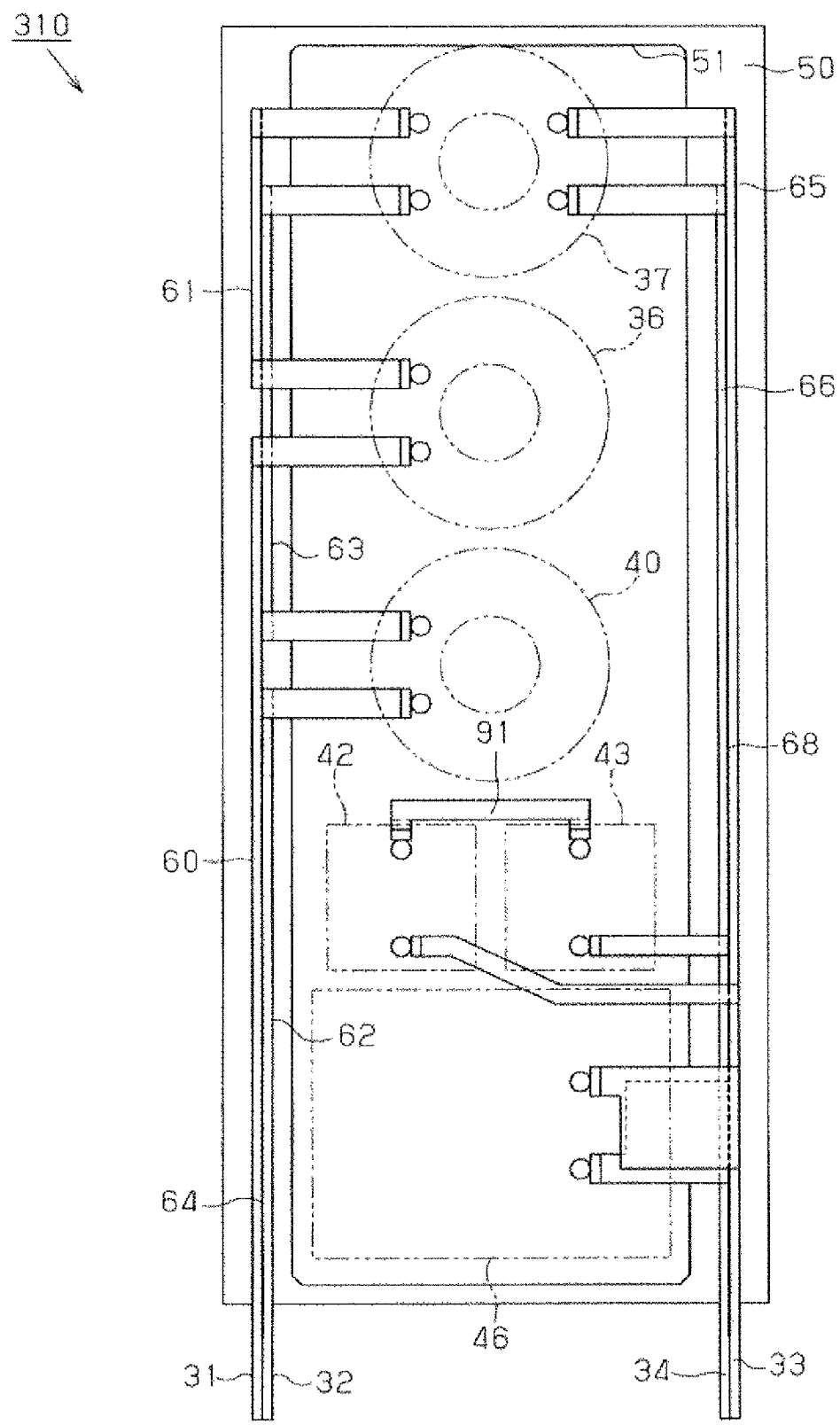
FIG. 12 is a plan view of a filter unit of a motor-driven compressor for a vehicle according to a third embodiment of the present invention.
Figure 13A:
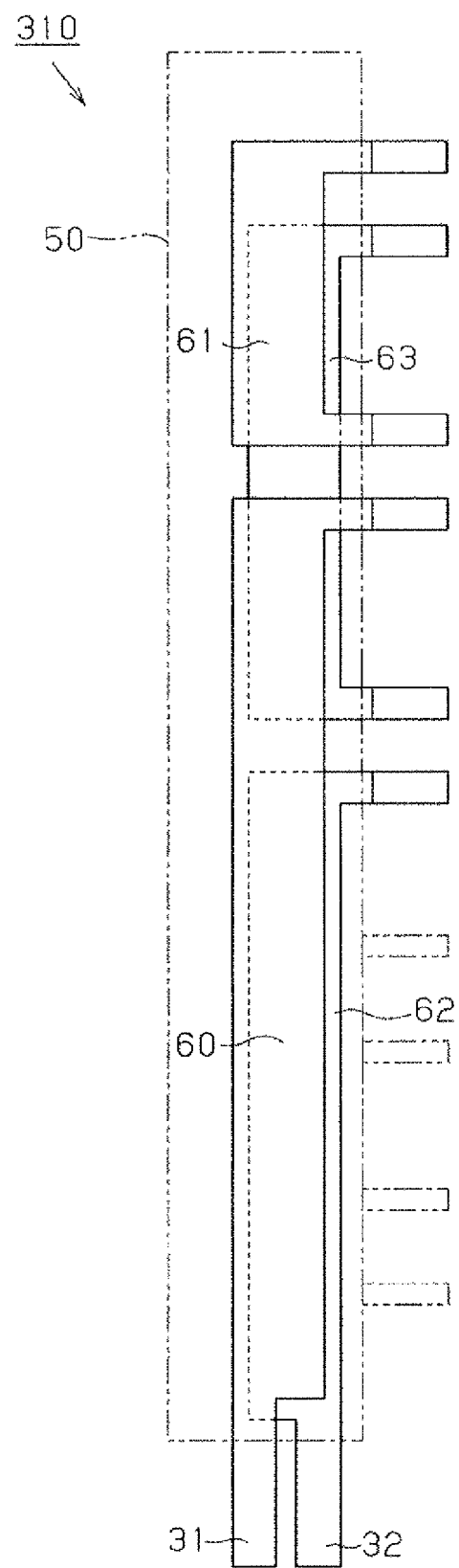
FIG. 13A is a view showing an arrangement of busbars of the filter unit as seen from the left side of FIG. 12.
Figure 13B:
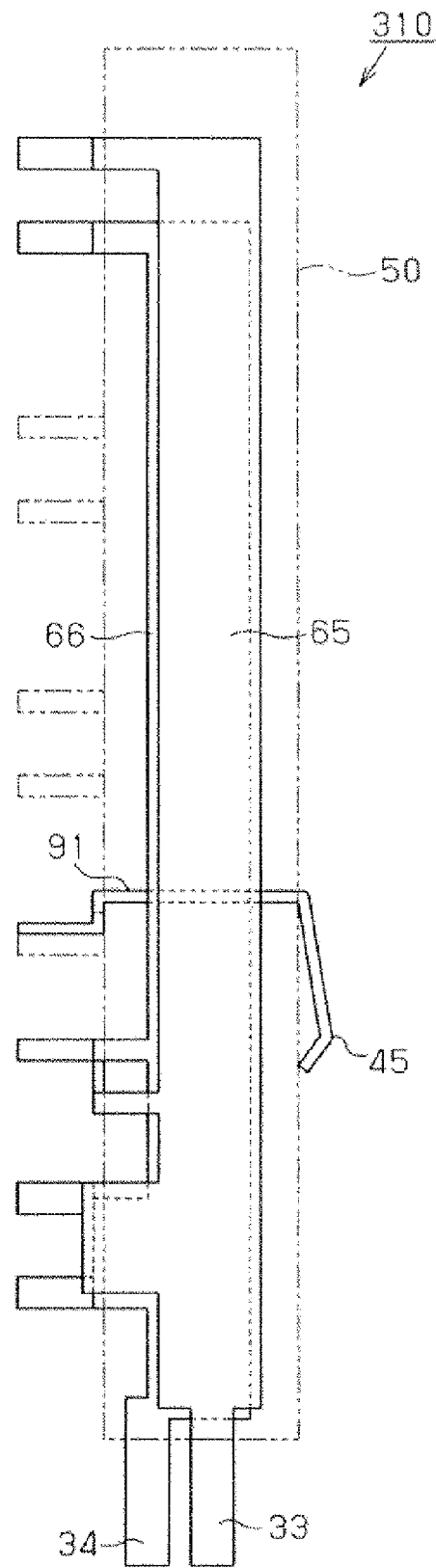
FIG. 13B is a view showing an arrangement of busbars of the filter unit as seen from the right side of FIG. 12.
Figure 14:
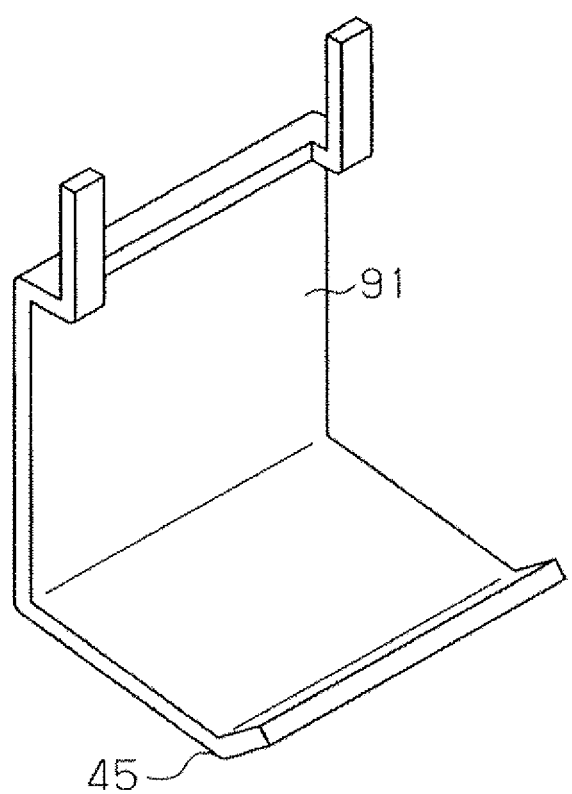
FIG. 14 is a perspective view of a busbar that forms a part of the ground line in the the filter unit of FIG. 12.

The following will describe a third embodiment of the motor-driven compressor for a vehicle according to the first preferred embodiment of the present invention with reference to FIGS. 12 to 14. The third embodiment differs from the second embodiment in the arrangement of the ground line in the filter unit.

Referring to FIG. 12 showing the filter unit 310 of the motor-driven compressor for a vehicle of the third embodiment, the busbar 91 which forms the ground line 44 of the filter circuit is not disposed at a lateral side of the case 50, but centrally in the width direction of the case 50.

As shown in FIGS. 13A and 13B, the busbar 91 extends downwardly in the case 50 and out from the bottom thereof. As shown in FIG. 14, the end of the busbar 91 lying outside the case 50 forms a spring plate having a bend and serving as the earth terminal of the filter circuit.

In the motor-driven compressor of the third embodiment, with the filter unit 310 installed in the second accommodation chamber 25 of the motor housing 10, the end of the busbar 91 which forms the spring plate is placed in pressing contact with the partition wall 26. Therefore, earth connection of the filter circuit is accomplished through the motor housing 10 in the motor-driven compressor.

Figure 15:
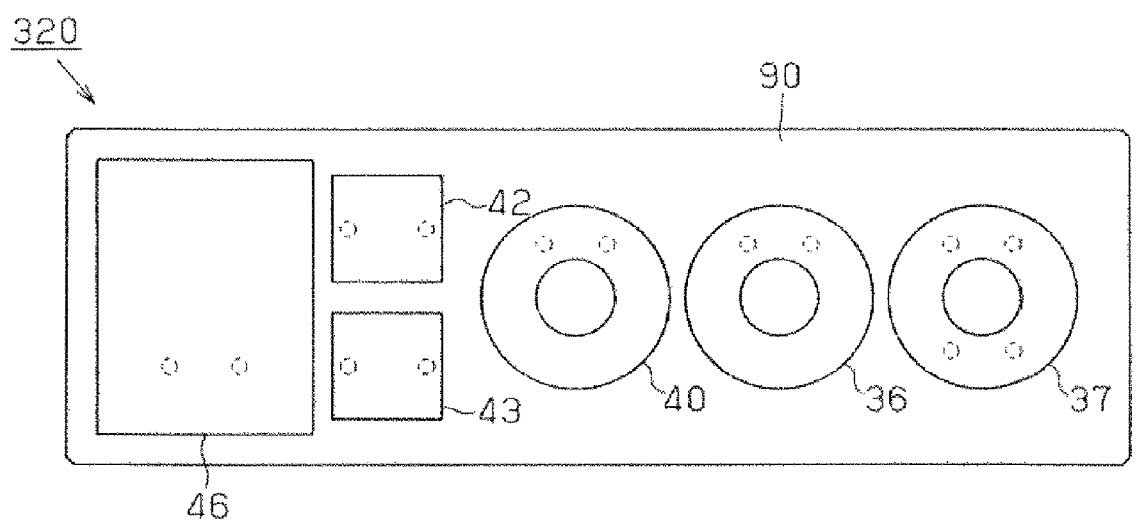
FIG. 15 is a plan view of a filter unit of a motor-driven compressor for a vehicle according to a fourth embodiment of the present invention.
Figure 16:
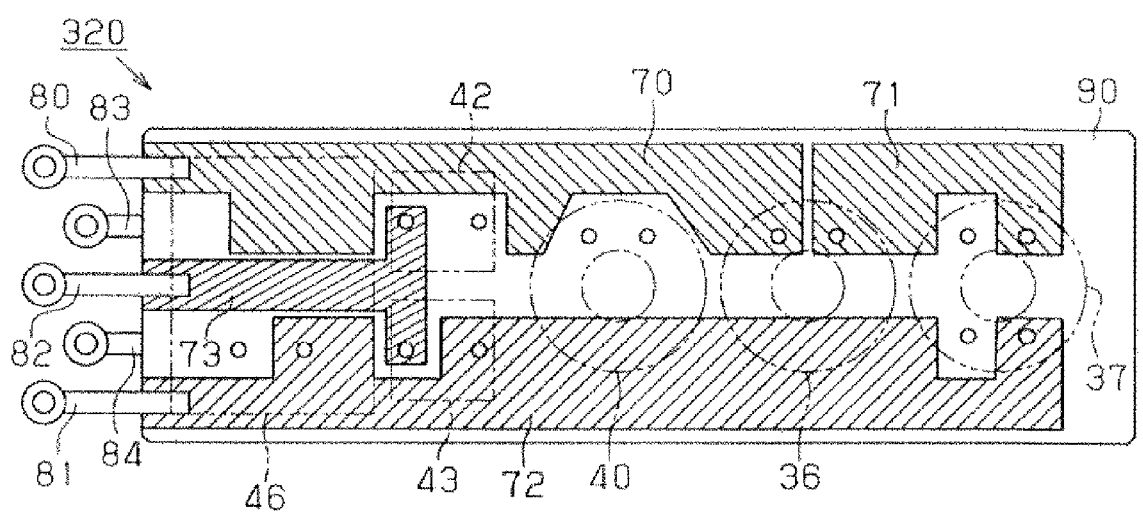
FIG. 16 is a schematic diagram showing a wiring pattern on the top surface of a substrate of the filter unit.
Figure 17:
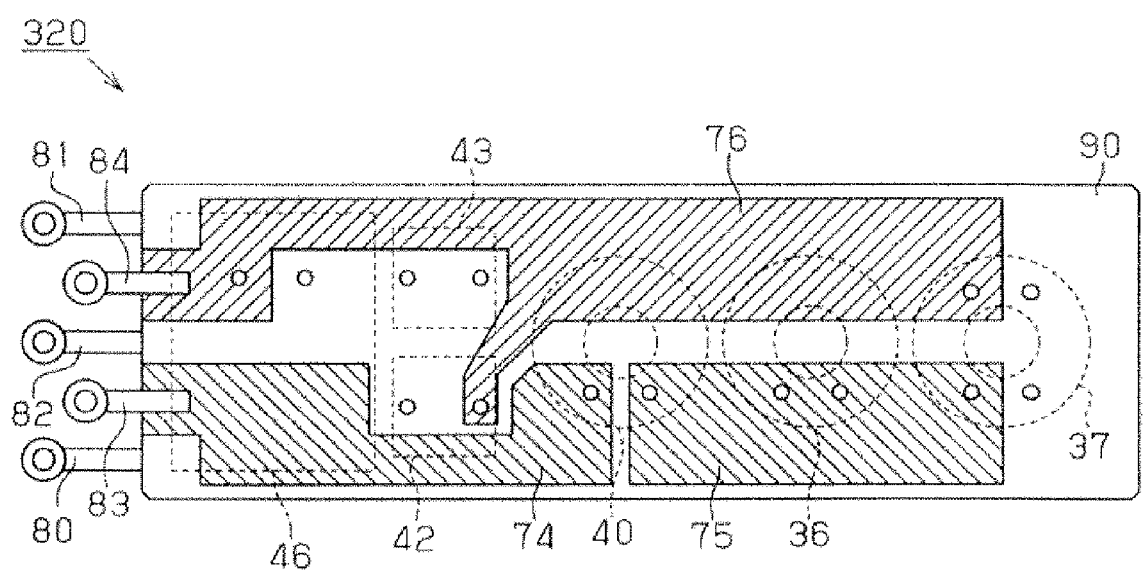
FIG. 17 is a schematic diagram showing a wiring pattern on the bottom surface of the substrate of the filter unit.

The following will describe a fourth embodiment of the motor-driven compressor for a vehicle according to the present invention with reference to FIGS. 15 to 17. The fourth embodiment differs from the first embodiment in that the filter circuit is formed on a substrate of the filter unit.

As shown in FIG. 15, the filter unit 320 has a substrate 90 made of an insulating material. The elements which constitute the filter circuit, namely, the normal coil 36, the common coil 37, the normal coil 40, the Y capacitors 42, 43, and the smoothing capacitor 46, are all provided on the same surface of the substrate 90. In the following description, the surface of the substrate 90 on which the elements are provided will be referred to as the top surface of the substrate 90, and the opposite surface of the substrate 90 will be referred to as the bottom surface of the substrate 90.

As shown in FIG. 16, printed wirings 70, 71 which form the positive input line 35 of the filter circuit, a printed wiring 72 which forms the positive output line 38, a printed wiring 73 which forms the ground line 44 are provided on the top surface of the substrate 90, respectively. The printed wirings 70, 71 are formed on the upper part of the substrate 90 as seen in FIG. 16, and the printed wiring 72 is formed on the lower part of the substrate 90.

Additionally, a positive input terminal 80 is connected to the printed wiring 70 at the left end thereof as seen in the drawing, a positive output terminal 81 is connected to the printed wiring 72 at the left end thereof, and an earth terminal 82 is connected to the printed wiring 73 at the left end thereof, respectively. The ends of the respective positive input terminal 80, the positive output terminal 81 and the earth terminal 82 are disposed outside the substrate 90, extending from the left end of the substrate 90 as seen in the drawing.

As shown in FIG. 17, printed wirings 74 and 75 which form the negative input line 39 of the filter circuit and a printed wiring 76 which forms the negative output line 41 are provided on the bottom surface of the substrate 90, respectively. The printed wirings 74, 75 are formed immediately below the printed wiring 70, 71 across the thickness of the substrate 90, and the printed wiring 76 is formed immediately below the printed wiring 72 as seen in the same direction, respectively.

A negative input terminal 83 is connected to the printed wiring 74 at the left end thereof as seen in FIG. 17 and a negative output terminal 84 is connected to the printed wiring 76 at the left end thereof, respectively. The negative input terminal 83 and the negative output terminal 84 are disposed outside the substrate, extending from the left end of the substrate as seen in the drawing.

In the present fourth embodiment constructed as described above, the input/output terminals 80 to 84 of the filter circuit are all drawn out of the filter unit 320 in the same direction. Therefore, the connection between the inverter circuit and each terminal of the filter circuit may be accomplished by movement of either one of the inverter circuit and the filter circuit relative to the other in one direction, which expedites the assembling of the filter circuit.

The printed wiring 70 and 71 which form the positive input line 35 of the filter circuit and the printed wiring 74 and 75 which form the negative input line 39 are arranged in parallel with the substrate 90 interposed therebetween. Moreover, the printed wiring 72 which forms the positive output line 38 of the filter circuit and the printed wiring 76 which forms the negative output line 41 thereof are also arranged in parallel with the substrate 90 interposed therebetween. In such structure of the filter unit 320, a transmission of noise is reduced more effectively.

The above embodiment(s) may be modified in various ways as exemplified as follows.

In the first to fourth embodiments, the passage in which refrigerant passes is formed in the motor housing 10 immediately below the filter circuit by forming the groove 28 on the accommodation space 27 side of the partition wall 26. Such refrigerant passage may be formed in any other ways. For example, the groove may be formed at the periphery of the electric motor 17. Additionally, as long as the desired cooling of the filter circuit is achieved, the groove may be dispensed with.

In the above embodiments, the transmission of noise between the input line and the output line is reduced by arranging the positive input line and the negative input line of the filter circuit in parallel with an insulating material interposed therebetween and also the positive output line and the negative output line of the filter circuit in parallel with an insulating material interposed therebetween. If the transmission of noise is kept low enough, such arrangement of the input/output lines need not necessarily be used.

In the above embodiments, the first accommodation chamber 22 is formed at an end of the housing of the motor-driven compressor and the second accommodation chamber 25 is formed extending in the axial direction and along the periphery of the housing. However, the position and/or the shape of the accommodation chambers may be changed as required. For example, the second accommodation chamber may be arranged at an end of the housing of the motor-driven compressor and the first accommodation chamber may be formed extending axially and along the periphery of the housing. Also in this case, an accommodation space for the filter circuit is easily achieved, if an accommodation chamber is provided for each of the inverter circuit and the filter circuit. Arranging the input/output terminals of the filter circuit so as to be drawn out in the same direction, connection to the terminals may be performed easily and, therefore, the assembling of the filter circuit may be facilitated.

In the above embodiments, the terminal 29A for power supply in the motor-driven compressor is drawn out from the first accommodation chamber 22 which accommodates therein the inverter circuit 24 so that the connecting position of the power supply cable is the same as in the the motor-driven compressor wherein the inverter circuit and the filter circuit are accommodated in the same accommodation chamber. The terminal 29A for power supply may be arranged so as to extend from the second accommodation chamber 25 or any other positions other than the first accommodation chamber 22 if the connecting position of the cable need not be the same position as the terminal 29A.

In the above embodiments, the input/output terminals of the filter circuit may be easily connected to the inverter circuit because the second accommodation chamber 25 is in communication with the first accommodation chamber 22 in the direction in which the input/output terminals of the filter circuit are drawn out therefrom. In the case that direct connection of the input/output terminals of the filter circuit to the inverter circuit is not necessary, the second accommodation chamber 25 may be formed in direct communication with the first accommodation chamber 22 in any direction other than the direction in which the input/output terminals of the filter circuit extend. Alternatively, it may be so arranged that the accommodation chambers are not in communication with each other.

A filter circuit other than the filter circuit which has been illustrated in the above embodiments may be adopted.

In the above embodiments, in assembling the inverter unit 23 and the filter unit 30, firstly the filter unit 30 is inserted into the second accommodation chamber 25. The assembling procedure may be changed. The following will illustrate an alternative procedure assembling. That is, firstly the filter unit 30 is connected to the inverter unit 23 and then the filter unit 30 and the inverter unit 23 are assembled to the inverter cover 12.

Next, the filter unit 30 and the inverter unit 23 are assembled to the inverter cover 12 into a subassembly and then the subassembly is fixed to the motor housing 10 by inserting the filter unit 30 into the second accommodation chamber 25.

What is claimed is:

1. A motor-driven compressor for a vehicle comprising:
    a housing,
    an inverter unit,
    an inverter circuit incorporated in the inverter unit,
    a filter unit connected to the inverter unit,
    a filter circuit incorporated in the filter unit,
    wherein a first accommodation chamber is formed in the housing, the inverter unit is incorporated in the first accommodation chamber, and
    a second accommodation chamber is formed in the housing,
    wherein the filter unit is incorporated in the second accommodation chamber, and the filter circuit has an input terminal and an output terminal that extend from the same direction from the filter circuit,
    wherein the housing has a cylindrical shape,
    wherein the first accommodation chamber is formed at an end of the cylindrical housing, and the second accommodation chamber is formed on the periphery of the cylindrical housing and extends in an axial direction of the cylindrical housing.

2. A motor-driven compressor for a vehicle according to claim 1, wherein the first accommodation chamber has an opening towards which the input and output terminals extend, wherein the second accommodation chamber is connected to the first accommodation chamber through the opening.

3. A motor-driven compressor for a vehicle according to claim 2, wherein a terminal for power supply of the motor-driven compressor extends out from the first accommodation chamber.

4. A motor-driven compressor for a vehicle according to claim 2, wherein a terminal for power supply of the motor-driven compressor extends in the same direction as the input and output terminals.

5. A motor-driven compressor for a vehicle according to claim 2, wherein a terminal for power supply of the motor-driven compressor extends out from the second accommodation chamber.

6. A motor-driven compressor for a vehicle according to claim 1, further comprising a terminal for power supply extending out from the first accommodation chamber,
    wherein the first accommodation chamber has an opening in any direction other than the direction in which the protruding input and output terminals of the filter circuit extend,
    the second accommodation chamber is connected to the first accommodation chamber through the opening.

7. A motor-driven compressor for a vehicle according to claim 1, wherein there is no passage connecting the first accommodation chamber and the second accommodation chamber.

8. A motor-driven compressor for a vehicle according to claim 1, further comprising a compression mechanism and an electric motor,
    wherein the housing is formed with an accommodation space which accommodates the compression mechanism and the electric motor, and a partition wall separates the accommodation space from the second accommodation chamber,
    wherein the compression mechanism and the electric motor are incorporated in the accommodation space in the axial direction of the electric motor, the filter unit extends in the axial direction of the electric motor, and the inverter unit extends in the direction transverse to the axis of the electric motor.

9. A motor-driven compressor for a vehicle according to claim 8,
    wherein the inverter circuit is connected to the electric motor through a metal terminal, and the metal terminal is incorporated in the housing and extends in the same direction as the input and output terminals.

10. A motor-driven compressor for a vehicle according to claim 8, further comprising a passage allowing refrigerant to flow therethrough formed at an accommodation space side of the partition wall.

11. A motor-driven compressor for a vehicle according to claim 1, wherein the filter circuit includes a positive input line, a positive output line, a negative input line, a negative output line, and an insulator,
    wherein the positive input line and the negative input line are arranged in parallel with the insulator interposed therebetween, and the positive output line and the negative output line are arranged in parallel with the insulator interposed therebetween.

12. A motor-driven compressor for a vehicle comprising:
    a housing,
    an inverter unit,
    an inverter circuit incorporated in the inverter unit,
    a filter unit connected to the inverter unit,
    a filter circuit incorporated in the filter unit,
    wherein a first accommodation chamber is formed in the housing, the inverter unit is incorporated in the first accommodation chamber, and
    a second accommodation chamber is formed in the housing,
    wherein the filter unit is incorporated in the second accommodation chamber, and the filter circuit has an input terminal and an output terminal that extend from the same direction from the filter circuit,
    wherein the housing has a cylindrical shape, wherein the second accommodation chamber is formed at an end of the cylindrical housing, and the first accommodation chamber is formed on the periphery of the cylindrical housing and extends in the axial direction of the cylindrical housing.

\* \* \* \* \*